EDGELL, ALEXANDER & KELLOGG.
Rotary Churn.
No. 37,437. Patented Jan. 20, 1863.
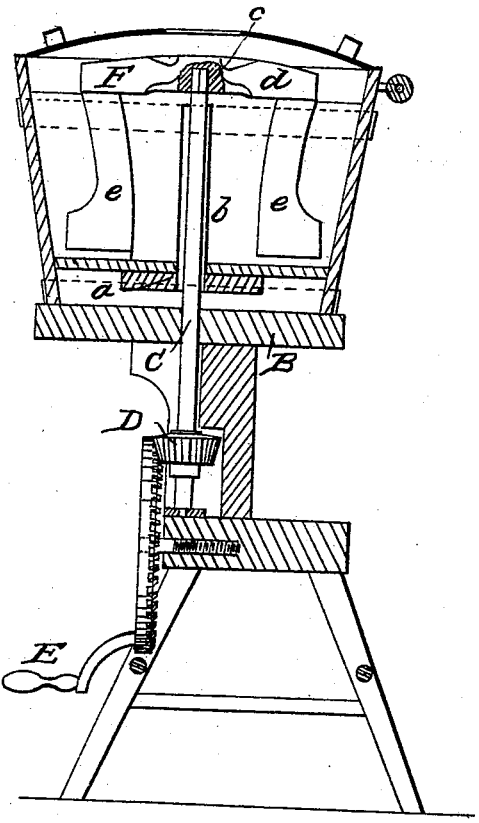
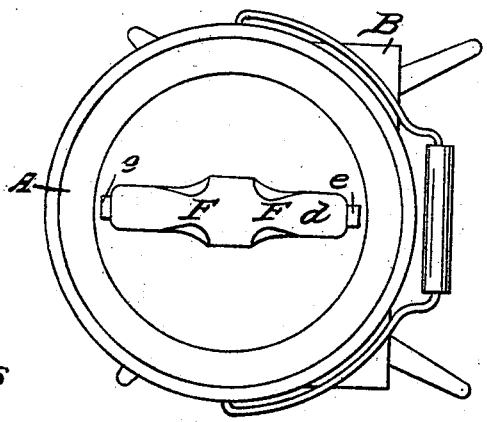
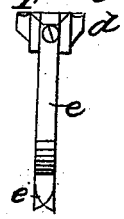
WITNESSES
INVENTORS:

UNITED STATES PATENT OFFICE.

J. B. EDGELL, E. A. ALEXANDER, AND H. C. KELLOGG, OF QUASQUETON, IOWA.

IMPROVEMENT IN CHURNS.

Specification forming part of Letters Patent No. 37,437, dated January 20, 1863.

*To all whom it may concern:*

Be it known that we, J. B. EDGELL, E. A. ALEXANDER, and H. C. KELLOGG, all of Quasqueton, in the county of Buchanan and State of Iowa, have invented a new and Improved Churn; and we do hereby declare that the following is a full, clear, and exact description of the same, reference being had to the accompanying drawings, forming a part of this specification, in which—

Figure 1 represents a vertical central section of our invention. Fig. 2 is a plan or top view of the same. Fig. 3 is a detached side elevation of the dasher.

Similar letters of reference in the three views indicate corresponding parts.

This invention consists in the arrangement of a dasher with a square socket fitting on the top of a vertical shaft and provided with two or more wings in such a manner that by imparting to the shaft a rotary motion the wings of the dasher are caused to sweep through the cream in the tub, and the butter is formed in a short time.

It consists, further, in the arrangement of a tube of metal, or other suitable material, which surrounds the vertical shaft, being firmly fastened to the bottom of the tub and extending up above the surface of the cream in such a manner that the tub is entirely independent of said vertical central shaft, and that it can be taken off or replaced whenever desired without permitting any portion of the cream to escape.

To enable those skilled in the art to make and use our invention, we will proceed to describe its construction and operation with reference to the drawings.

The tub A is made in the ordinary manner and shape, and it is provided with a central opening, *a*, to receive a tube, *b*, of zinc, or other suitable material. This tube is secured to the bottom of the tub in such a manner that a perfectly tight joint is produced, and that the cream in the tub has no chance to escape on the sides of said tube, and it (the tube) rises up above the surface of the cream that will be put in the tub.

B is a platform or bench, which forms the bearing for the vertical shaft C, to which a rotary motion is imparted by the bevel-gear D and winch E, or in any other desirable manner. When the tub is placed on the platform B, the shaft C extends up through the tube *b* and above the upper edge of the same, and its upper end is made square to fit into a corresponding socket, *c*, in the horizontal cross-bar *d* of the dasher F. This dasher is constructed of two descending arms or wings, *e*, which are rigidly attached to the ends of the cross-bar *d*, and which extend nearly down to the bottom of the tub, as clearly shown in Fig. 1 of the drawings. The lower ends of the wings are spread so that the same present a wider surface to the cream than the balance of said wings, and their lower edges are chamfered off in opposite directions, as clearly shown in Fig. 3, so that in rotating the dasher in one direction the surfaces with the chamfered edges are presented to the cream, and in rotating the dasher in the opposite direction the flat surfaces of the wings are presented to the cream. A cover, G, with a central aperture, *f*, fits on the tub.

The operation is as follows: After the tub A has been placed on the platform B, so that the shaft C extends up through the tube *b*, and when the dasher is adjusted on the top of said shaft, a certain quantity of cream is introduced to fill the tub about half or more, care being taken to keep the surface of the cream well below the top edge of the tube *d*. The dasher is now rotated, and by the action of the wings on the cream the butter is formed. After the formation of the butter is complete, the motion of the dasher is reversed, and by the action of the opposite surfaces of the wings the butter is worked.

The principal advantages of our churn are that the same is simple in its construction and easy in its operation. It can be adapted to tubs of any description, and when the tub is taken off from the platform B it can easily be cleaned.

Having thus fully described our invention, what we claim as new, and desire to secure by Letters Patent, is—

1. Suspending the dasher F from the top end of a vertical shaft, C, substantially in the manner and for the purpose herein shown and described.

2. The arrangement of the central tube, b, fastened to the bottom of the tub A, in combination with the vertical shaft C, constructed and operating as and for the purpose herein specified.

J. B. EDGELL.
E. A. ALEXANDER.
H. C. KELLOGG.

Witnesses:
H. HURSEY,
A. CROOKS,